(12) United States Patent
Shinogi

(10) Patent No.: US 6,246,931 B1
(45) Date of Patent: Jun. 12, 2001

(54) METHOD OF AND APPARATUS FOR DETERMINING OPTIMUM DELIVERY ROUTE FOR ARTICLES

(75) Inventor: Yoshihisa Shinogi, Sakado (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/337,273

(22) Filed: Jun. 22, 1999

(30) Foreign Application Priority Data

Jun. 24, 1998 (JP) .................................................. 10-177369

(51) Int. Cl.$^7$ .................................................. G01C 22/00
(52) U.S. Cl. .................................. 701/24; 701/23; 701/25; 701/201; 701/202; 701/208; 340/491; 180/167
(58) Field of Search ..................................... 701/202, 201, 701/24, 25, 26, 208, 23; 319/580; 180/167, 8, 168; 340/941

(56) References Cited

U.S. PATENT DOCUMENTS 5,023,790 * 6/1991 Luke, Jr. ................................. 701/24

FOREIGN PATENT DOCUMENTS 52-115064  9/1977 (JP) .

OTHER PUBLICATIONS

"Neutral Network", edited by Motoki Yagawa, published by K. K. Baifukan, May 30, 1992.

* cited by examiner

Primary Examiner—William A. Cuchlinski, Jr.
Assistant Examiner—Arthur D. Donnelly
(74) Attorney, Agent, or Firm—Armstrong, Westerman, Hattori, McLeland & Naughton

(57) ABSTRACT

A delivery route for an article is automatically generated without the need for training a delivery robot for its path of movement. A spatial structure in which the delivery robot is movable is described from a delivery start position to a delivery destination position according to a quadtree method, and stored as a map in a memory. A safety connection weight calculator calculates the weight of a connection relative to the safety of a direction of delivery, by referring to the stored map, and an objective direction connection weight calculator calculates the weight of an objective direction connection taking into account a shortest distance in the direction of delivery, by referring to the stored map. A preceding direction of delivery is considered from an output of a neutral network processor, and established in the neutral network processor via a feedback connection weight setting unit. The neutral network processor autonomously generates optimum delivery route data according to the error backpropagation learning algorithm.

11 Claims, 6 Drawing Sheets

FIG. 3    16 DELIVERY ROBOT

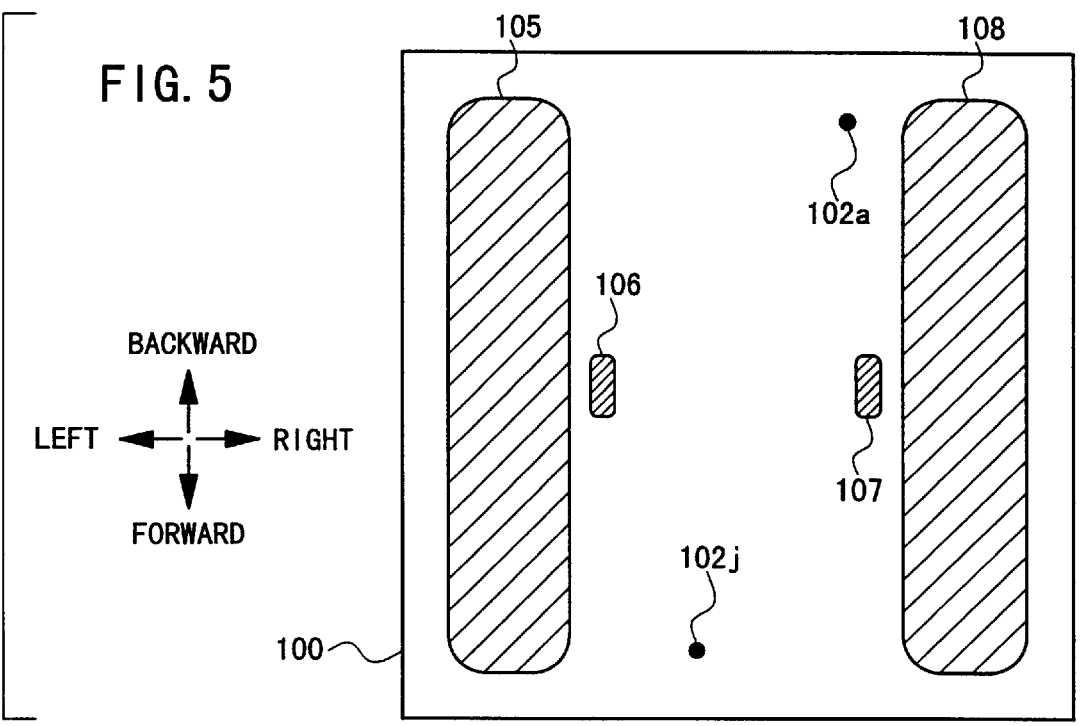
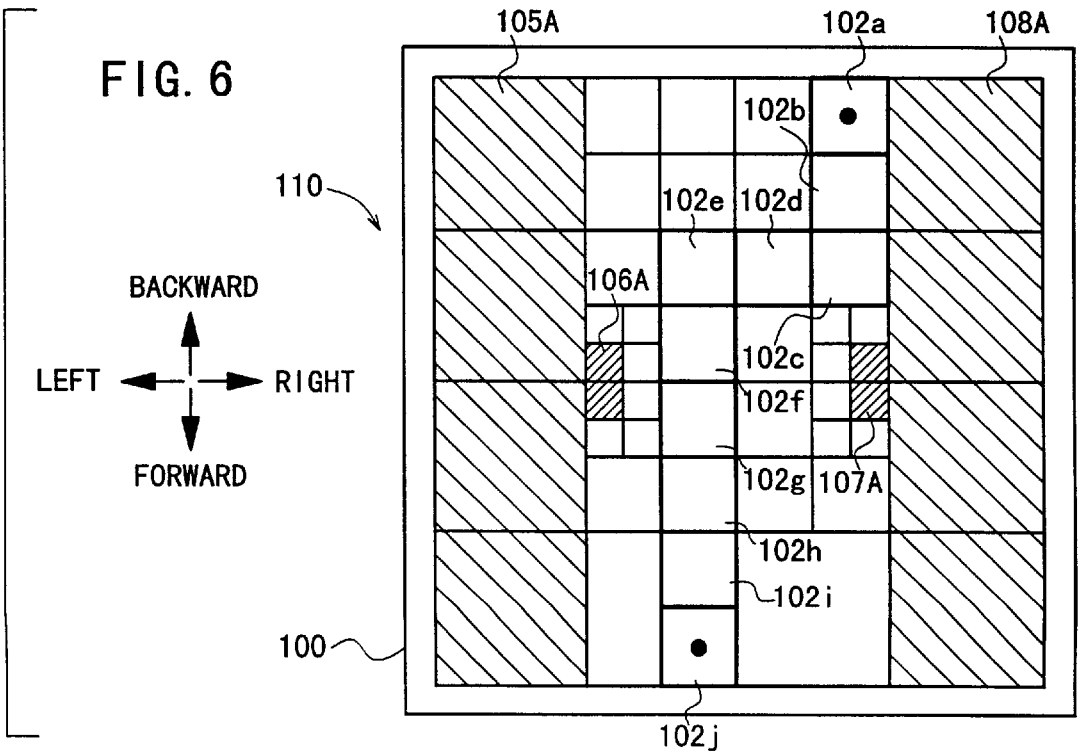

FIG. 7

| NUMBER OF TIMES | INPUT LAYER ||||||||||||
| --- | --- | --- | --- | --- | --- | --- | --- | --- | --- | --- | --- | --- |
| | SAFETY g1 ||| OBJECT g2 |||| FEEDBACK gf |||
| | FORWARD | LEFT | RIGHT | BACKWARD | FORWARD | LEFT | RIGHT | BACKWARD | FORWARD | LEFT | RIGHT | BACKWARD |
| 1 | 1.0000 | 1.0000 | 0.0000 | 0.0000 | 1.0000 | 0.7000 | 0.0000 | 0.0000 | 0.0000 | 0.0000 | 0.0000 | 0.0000 |
| 2 | 0.7000 | 1.0000 | 0.0000 | 0.7000 | 1.0000 | 0.7000 | 0.0000 | 0.0000 | 0.9752 | 0.0081 | 0.0000 | 0.0000 |
| 3 | 0.0000 | 1.0000 | 0.0000 | 1.0000 | 1.0000 | 0.7000 | 0.0000 | 0.0000 | 0.9799 | 0.0069 | 0.0000 | 0.0000 |
| 4 | 1.0000 | 0.7000 | 0.0000 | 1.0000 | 1.0000 | 0.7000 | 0.0000 | 0.0000 | 0.0007 | 0.7640 | 0.0000 | 0.0009 |
| 5 | 1.0000 | 0.0000 | 0.7000 | 1.0000 | 1.0000 | 0.0000 | 0.7000 | 0.0000 | 0.0377 | 0.2968 | 0.0000 | 0.0007 |
| 6 | 1.0000 | 0.0000 | 1.0000 | 1.0000 | 1.0000 | 0.0000 | 0.7000 | 0.0000 | 1.0000 | 0.0014 | 0.0000 | 0.0000 |
| 7 | 1.0000 | 0.0000 | 1.0000 | 1.0000 | 1.0000 | 0.0000 | 0.7000 | 0.0000 | 0.9978 | 0.0000 | 0.0013 | 0.0000 |
| 8 | 1.0000 | 0.7000 | 1.0000 | 1.0000 | 1.0000 | 0.0000 | 0.7000 | 0.0000 | 0.9978 | 0.0000 | 0.0013 | 0.0000 |
| 9 | 0.7000 | 0.0000 | 0.0000 | 0.0000 | 1.0000 | 0.0000 | 0.7000 | 0.0000 | 0.9900 | 0.0002 | 0.0306 | 0.0000 |
| 10 | 0.0000 | 0.0000 | 0.0000 | 0.0000 | 1.0000 | 0.0000 | 0.7000 | 0.0000 | 0.9805 | 0.0002 | 0.0536 | 0.0000 |

| NUMBER OF TIMES | OUTPUT fo ||||  |
| --- | --- | --- | --- | --- | --- |
| | FORWARD | LEFT | RIGHT | BACKWARD | GOAL ARRIVAL | EMERGENCY AVOIDANCE |
| 1 | 0.9752 | 0.0081 | 0.0000 | 0.0000 | 0.0031 | 0.0004 |
| 2 | 0.9799 | 0.0069 | 0.0000 | 0.0000 | 0.0031 | 0.0004 |
| 3 | 0.0007 | 0.7640 | 0.0000 | 0.0009 | 0.0171 | 0.0016 |
| 4 | 0.0377 | 0.2968 | 0.0000 | 0.0007 | 0.0064 | 0.0013 |
| 5 | 1.0000 | 0.0014 | 0.0000 | 0.0000 | 0.0000 | 0.0004 |
| 6 | 0.9978 | 0.0000 | 0.0013 | 0.0000 | 0.3526 | 0.0006 |
| 7 | 0.9978 | 0.0000 | 0.0013 | 0.0000 | 0.3535 | 0.0006 |
| 8 | 0.9900 | 0.0002 | 0.0306 | 0.0000 | 0.0083 | 0.0002 |
| 9 | 0.9805 | 0.0002 | 0.0536 | 0.0000 | 0.0114 | 0.0002 |
| 10 | 0.0000 | 0.0233 | 0.0481 | 0.0000 | 0.9090 | 0.0022 |

METHOD OF AND APPARATUS FOR DETERMINING OPTIMUM DELIVERY ROUTE FOR ARTICLES

BACKGROUND OF THE INVENTION

1. Field of the Invention

The present invention relates to a method of and an apparatus for determining an optimum delivery route for articles, which are preferably applicable to material handling robots for loading, transporting, and unloading articles.

2. Description of the Related Art

Some conventional material handling robots are designed as a playback robot, as disclosed in Japanese laid-open patent publication No. 52-115064, for example. Basically, a playback robot operates as follows: The operator takes the playback robot through a training process to teach the path of the end effector to the robot with a teaching box or the like, and stores data of the path of the end effector in a robot controller. When the robot operates, it automatically delivers workpieces with the end effector based on the stored data of the path thereof.

However, the training process that the operator carries out to instruct the robot with the teaching box or the like is time-consuming. In addition, the operator is required to be highly skilled to determine an optimum path for the end effector, i.e., a path for delivering workpieces along a shortest distance within a shortest period of time safely without any possible collision with obstacles. As a result, the cost of delivery of workpieces with the robot is relatively high.

SUMMARY OF THE INVENTION

It is therefore an object of the present invention to provide a method of and an apparatus for automatically, i.e., autonomously, determining an optimum delivery route for articles.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a diagram illustrative of input data;

FIG. 6 is a diagram illustrative of a process of generating a map and an optimum delivery route; and FIG. 7 is a diagram showing data in input and output layers in the neural network processor.

DESCRIPTION OF THE PREFERRED EMBODIMENT

Figure 1:
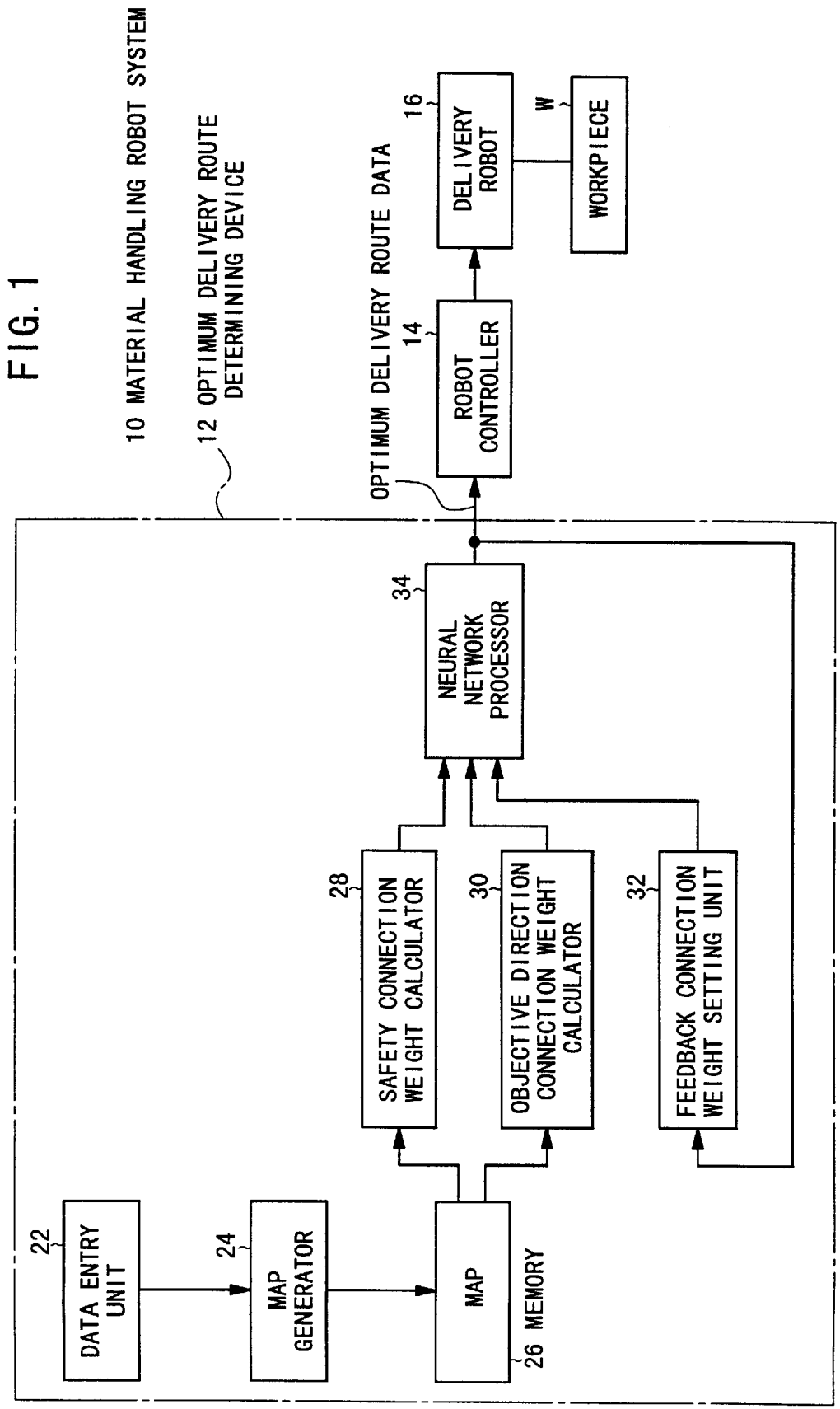
FIG. 1 is a block diagram of a material handing robot system according to an embodiment of the present invention.

FIG. 1 shows in block form a material handing robot system 10 according to an embodiment of the present invention.

As shown in FIG. 1, the material handing robot system 10 basically comprises an optimum delivery route determining device 12 for generating optimum delivery route data, a robot controller 14 for storing the optimum delivery route data generated by the optimum delivery route determining device 12, and a delivery robot 16 that is a material handling robot controlled by the robot controller 14 based on the optimum delivery route data stored therein.

The optimum delivery route determining device 12 comprises a computer having a central processing unit (CPU) as a control means and memory means including a ROM, a RAM, and a hard disk, a display unit connected to the computer, and a mouse and a keyboard as pointing devices connected to the computer. The optimum delivery route determining device 12 may instead comprise a laptop-type personal computer with an integral display panel, which is designed as a dedicated machine having a dedicated keyboard suitable for neural network processing and incorporated in a console.

The optimum delivery route determining device 12 has a data entry unit 22 for entering environmental data representing a delivery start position (loading start position) for a workpiece W as an article to be delivered, a delivery destination position (loading position) for the workpiece W, and the positions of obstacles to movement of the delivery robot 16, into a map generator 24.

The map generator 24 analytically describes a spatial structure in which the delivery robot 16 can move according to the quadtree method based on the entered positional data of the delivery start position, the delivery destination position, and the obstacles, generates map data, and stores the generated map data in a memory 26 as a storage means.

A safety connection weight calculator 28 and an objective direction connection weight calculator 30 refer to the map data stored in the memory 26 to calculate, respectively, the weight of a safety connection taking into account the safety of the direction of delivery and the weight of an objective direction connection taking into account the shortest distance along the direction of delivery, and supply the calculated weights to a neural network processor 34.

The neural network processor 34 outputs optimum delivery route data. Of the optimum delivery route data outputted from the neural network processor 34, outputs from calculating steps are stored in a feedback connection weight setting unit 32 as a memory means. The weight of a feedback connection serves to take into account the preceding direction of delivery for determining an optimum delivery route in the direction of delivery.

Based on the weight of the safety connection, the weight of the objective direction connection, and the weight of the feedback connection, the neural network processor 34 determines an optimum direction of travel, finally determines an optimum delivery route for the article, and outputs the data of the determined optimum delivery route to the robot controller 14 that is of known nature.

In the present embodiment, the optimum delivery route data represents data representative of a delivery route along which the delivery robot 16 delivers the workpiece W along a shortest distance within a shortest period of time safely without any possible collision with obstacles. In order to minimize the delivery time, if different delivery routes having the same distance are available, then one of the delivery routes should be selected for delivering the workpiece W along one general direction as much as possible with a reduced number of right turns, left turns, ascents, and descents.

Figure 2:
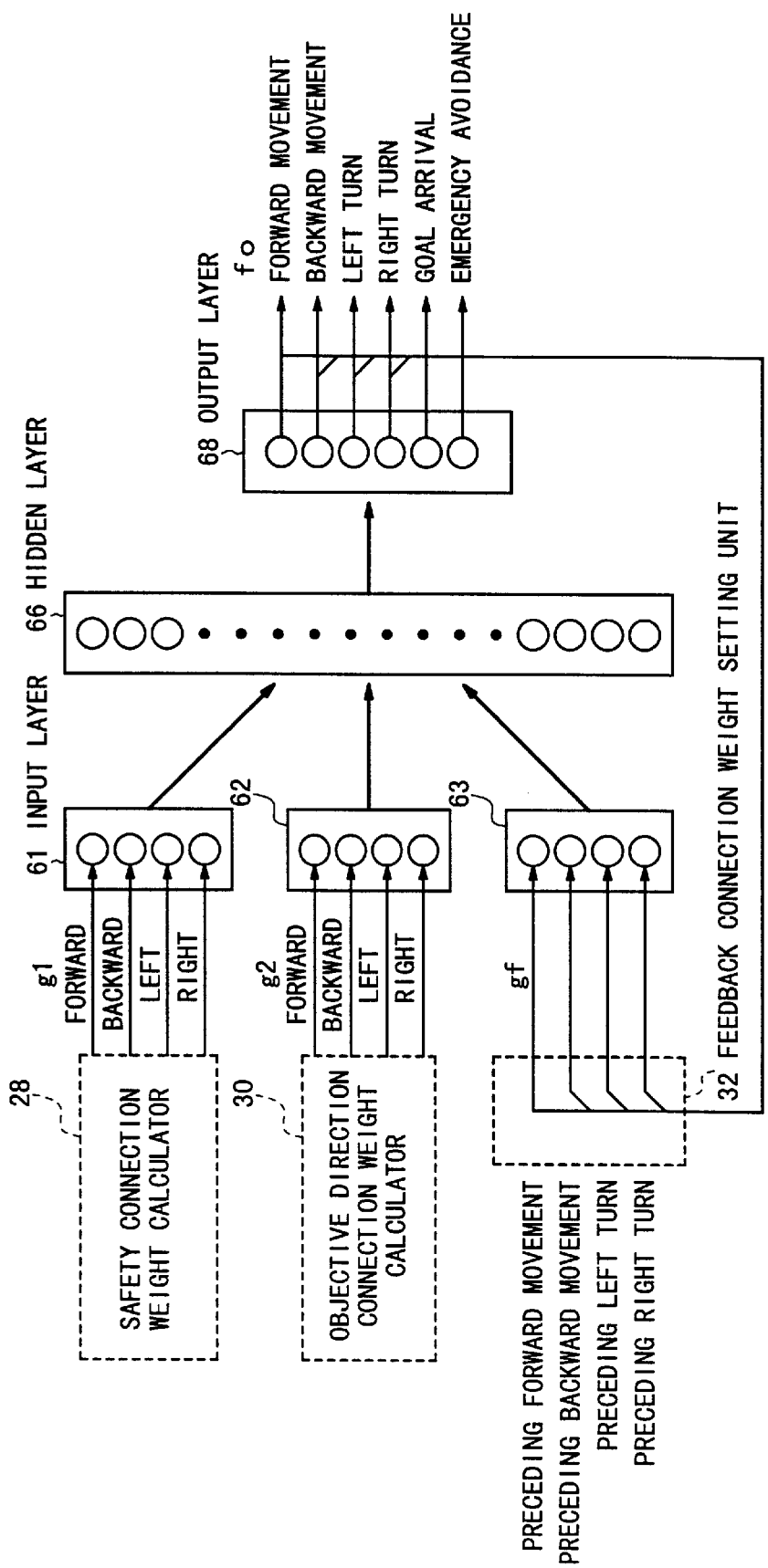
FIG. 2 is a block diagram showing a neural network processor of the material handing robot system shown in FIG. 1.

FIG. 2 shows the neural network processor 34 in the optimum delivery route determining device 12 of the material handing robot system 10 shown in FIG. 1. The neural network processor 34 has a multilayered network structure employing the known error backpropagation learning algorithm, and comprises three input layers 61, 62, 63, six hidden layers 66 (only one hidden layer 66 is shown for the sake of brevity, but actually six hidden layers 66 are connected in series), and an output layer 68. The output layer 68 has a response function fo (forward, backward, left turn, right turn, goal arrival, and emergency avoidance) which is a sigmoid function which is continuously variable between standardized values 0, 1. The response function fo is also referred to as an output fo. When the neural network processor 34 finishes its processing calculations carried, the neural network processor 34 outputs the response function fo as representing the optimum delivery route data for the delivery of the workpiece W.

Data of the input layers 61, 62, 63, i.e., weight data g1 (forward, backward, left, right) of the safety of forward, backward, left, right directions, weight data g2 (forward, backward, left, right) of the connection in the objective direction, and weight data gf (preceding forward movement, preceding backward movement, preceding left turn, and preceding right turn) of the feedback connection, are similarly standardized so as to be continuously variable between the values 0, 1.

The neural network processor 34 may employ a neural network process as described in "Neural network", edited by Motoki Yagawa, published by K. K. Baifukan, May 30, 1992, pages 132–138.

As shown in FIG. 1, based on the optimum delivery route data outputted from the neural network processor 34, the robot controller 14 controls the delivery robot 16 to deliver the workpiece W from the delivery start position to the delivery destination position safely along the shortest distance within the shortest period of time.

Figure 3:
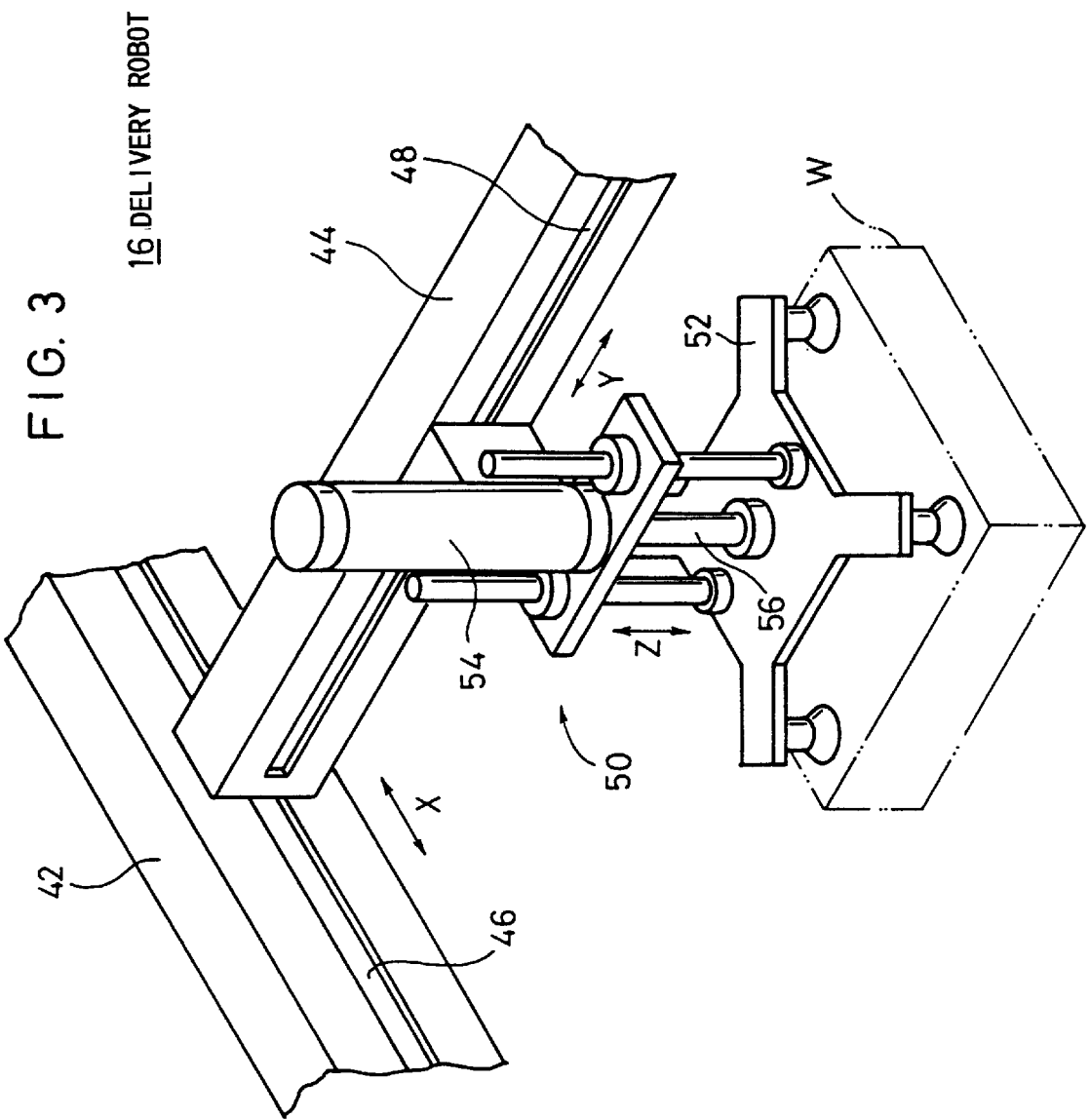
FIG. 3 is a fragmentary perspective view of a delivery robot of the material handing robot system.

FIG. 3 fragmentarily shows a general structure of the delivery robot 16. As shown in FIG. 3, the delivery robot 16 comprises a robot movable along three axes, i.e., X-, Y-, and Z-axes perpendicular to each other, such as a ceiling-mounted crane robot. The delivery robot 16 has two parallel fixed beams 42 (only one shown) spaced from each other and a movable beam 44 extending between and movable along the fixed beams 42. The movable beam 44 can be moved in the directions indicated by the arrow X along guides 46 of the fixed beams 42 by a rotary actuator as an X-axis motor (not shown). The movable beam 44 has a guide 48 along which a robot hand 50 is movable in the directions indicated by the arrow Y by a rotary actuator as a Y-axis motor (not shown). The robot hand 50 supports on its lower end a suction attracting unit 52 as an end effector. The attracting unit 52 is vertically movable in the directions indicated by the arrow Z by a cylinder 54 that has a vertically movable piston rod 56 connected to the suction attracting unit 52. The suction attracting unit 52 is supplied with compressed air from an air pressure source (not shown).

The X-axis motor, the Y-axis motor, and the cylinder 54 are accurately controlled for their displaced positions by the robot controller 14. The air pressure source is also accurately controlled for its compressed air pressure by the robot controller 14 via a PLC (programmable logic controller) and a solenoid-operated valve (both not shown).

The robot hand 50 with the suction attracting unit 52 is capable of lifting the workpiece W upwardly along the Z-axis at the delivery start position, delivering the workpiece W along the X- and Y-axes in forward, backward, left, and right directions, and lowering the workpiece W downwardly along the Z-axis at the delivery destination position, for thereby delivering the workpiece W to a desired position within a deliverable range. At other points than the delivery start position and the delivery destination position, a delivery route for delivering the workpiece W along the Z-axis may be selected as an optimum delivery route. For example, if an obstacle is of a stepped configuration, then a delivery route along the stepped configuration serves as an optimum delivery route.

In reality, the suction attracting unit 52 of the robot hand 50 has sensors on its surface facing the workpiece W for detecting the position and dimensions of the workpiece W attracted by the suction attracting unit 52.

Figure 4:
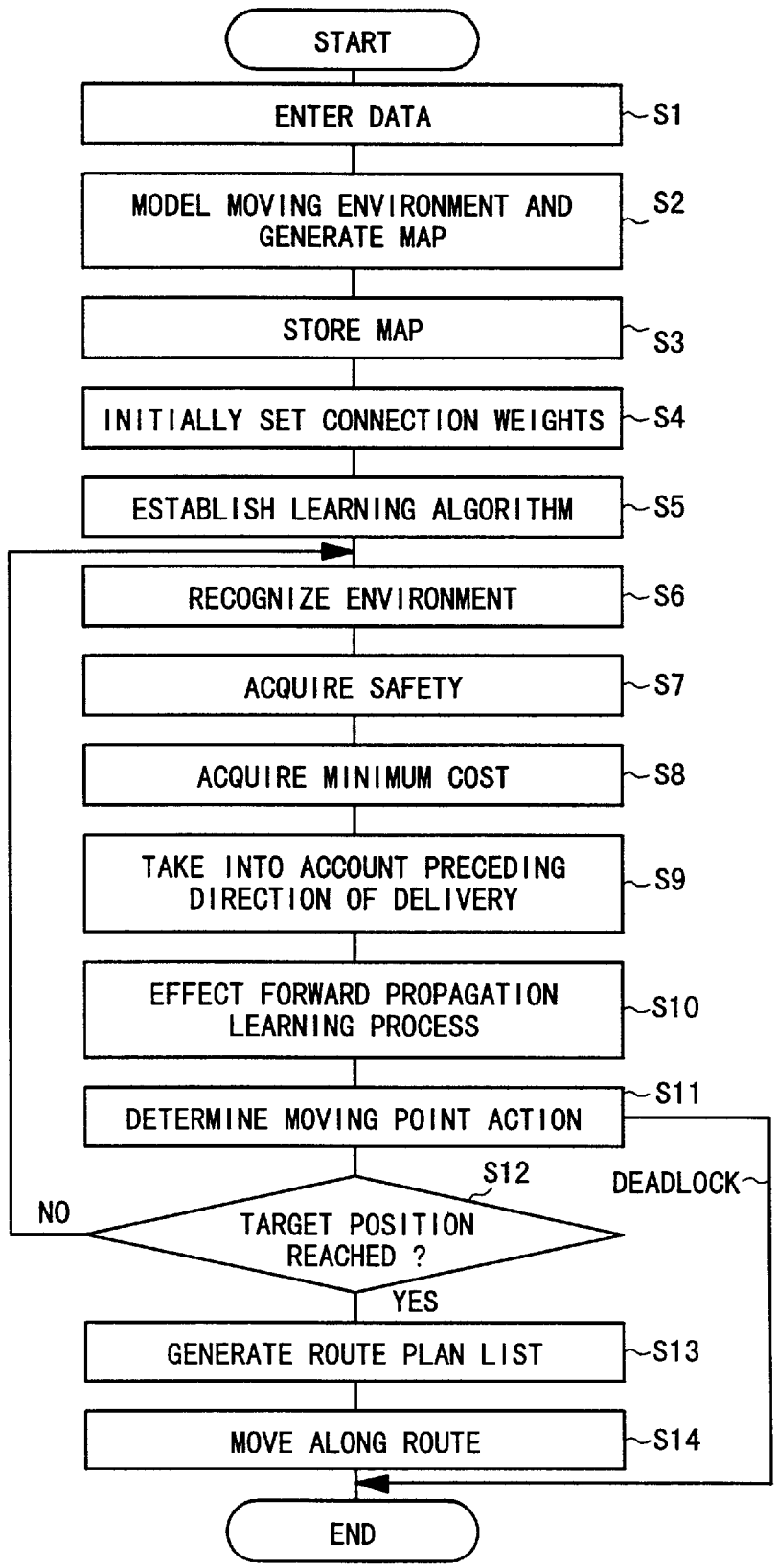
FIG. 4 is a flowchart of an operation sequence of the material handing robot system.

Operation of the material handling robot system 10 thus constructed will be described below with reference to FIGS. 4 through 7. FIG. 4 shows an operation sequence of the material handing robot system 10, which represents a basic algorithm for route searching.

As shown in FIG. 5, a movable range 100 of the delivery robot 16, a delivery start position 102a of the delivery robot 16, a delivery destination position 102j of the delivery robot 16, and positions (coordinates) of obstacles 105, 106, 107, 108 (shown hatched) are entered from the data entry unit 22 into the map generator 24 in step S1.

When the above data are entered, directions of delivery (forward, backward, left, and right) are uniquely determined. While the directions of delivery actually include Z-axis directions, i.e., upward and downward directions, it is assumed for an easier understanding that the delivery start position 102a, the delivery destination position 102j, and the directions of delivery of the workpiece W held by the suction attracting unit 52 are in one horizontal plane.

The map generator 24 models the moving environment entered as the data in step S1, and automatically generates a map in step S2. The map generator 24 describes, in the movable range 100, a multilayered array ranging from large frames to small frames (actually three-dimensional frames) including obstacles 105A, 106A, 107A, 108A and movable ranges (also referred to as cells) □ (see FIG. 6), according to the quadtree method. Stated otherwise, the map generator 24 describes a movable spatial structure. The size of each of the movable ranges or cells □, i.e., the size of a unit distance of delivery by the robot hand 50 (also referred to as a unit delivery distance), is determined to be the length of one side (actually height, width, or length) of a hypothetical rectangular parallelepiped that circumscribes the workpiece W.

FIG. 6 shows a map 110 which has been automatically generated and stored in the memory 26 in step S3. It can be seen from FIG. 6 that since the spatial structure in which the delivery robot 16 can move is described in a multi-layered fashion using the quadtree, a spatial description is simplified and the environmental recognition is facilitated with the spatial structure which has a relatively small number of obstacles 105A, 106A, 107A, 108A shown hatched.

Then, the input layers 61, 62, 63 of the neural network processor 34 are initially set to the weight data g1 of the safety connection, the weight data g2 of the objective direction connection, and the weight data gf of the feedback connection in step S4. The weight data g1, g2, gf are established by random numbers generated by a pseudo-random number generator (not shown) such that they are of values in the range: $-0.3 \leq g1, g2, gf \leq +0.3$.

Then, the sequence of a learning algorithm is established in step S5. In this embodiment, the forward propagation learning algorithm and the error backpropagation learning algorithm are repeated.

Prior to describing in detail a repeated processing in steps S6 through S9, the process of each of steps S6 through S9 will briefly be described below for an easier understanding of the present invention.

After step S5, an environmental recognition process is carried out to acquire the information of the cells □ around the present position of the robot hand 50 is acquired by referring to the map data stored in the memory 26, in step S6.

Then, as described in detail later on, the safety connection weight calculator 28 acquires information about whether there are obstacles or not, and the positions of cells □ where obstacles are present, around the present position of the robot hand 50, by referring to the map data stored in the memory 26, in step S7.

Thereafter, the objective direction connection weight calculator 30 acquires information about the direction of a shortest distance up to the delivery destination position (destination position or target position) 104, i.e., the direction of delivery with a minimum cost, in step S8.

In view of the preceding direction of delivery, the feedback connection weight setting unit 32 sets the input layer 63 to the weight data gf of the feedback connection in step S9. In the first setting cycle, there is no preceding direction of delivery, and hence the weight data gf (forward movement, left movement, right movement, and backward movement) of the feedback connection is gf=0.

The processes of steps S6 through S9 will be described in greater detail below. In steps S6 and S7, the safety connection weight calculator 28 calculates the weight data g1 of the safety connection by referring to the map data stored in the memory 26. If an obstacle is present in a next cell □ (the shape of the cell is a square containing the delivery start position 102a, for example) in a candidate direction of delivery, a direction in which to deliver the workpiece W), i.e., if the workpiece W cannot be delivered, the safety connection weight calculator 28 sets the weight data g1 to g1=0. If an obstacle is present in a cell next to the next cell □ in the candidate direction of delivery, i.e., if an obstacle is present in a position two unit delivery distances away, and the workpiece W needs to be decelerated, then the safety connection weight calculator 28 sets the weight data g1 to a value somewhere between 0.5 and 0.8, preferably g1=0.7. If no obstacle is present in a third cell □ in the candidate direction of delivery, i.e., if an obstacle is present in a position three unit delivery distances away, then the safety connection weight calculator 28 sets the weight data g1 to g1=1.00.

As shown in FIG. 7, with the above rule considered at the delivery start position 102a, since the candidate direction of delivery "backward movements" represents a region outside of the movable range 100 in a first processing cycle, the weight data g1 (backward movement) of the safety connection is set to g1 (backward movement)=0 (written as 0.0000 in FIG. 7) in the input layer 61. Similarly, the candidate direction of delivery "right" represents the obstacle 108A present in a next cell □, the workpiece W cannot be moved in that direction, and the weight data g1 (right) of the safety connection is set to g1 (right)=1 in the input layer 61.

The candidate directions of delivery "left" and "forward movements" represent two successive cells □ where the workpiece W is movable, the weight data g1 (left) of the safety connection and the weight data g1 (forward movement) of the safety connection are set to g1 (left)=1 (written as 1.0000 in FIG. 7) and g1 (forward movement)=1 in the input layer 61.

In the process of acquiring the minimum cost in step S8, the objective direction connection weight calculator 30 calculates the weight data g2 of the objective direction connection. If the candidate direction of delivery indicates a route of the shortest distance to the delivery destination position 102j, then the objective direction connection weight calculator 30 sets the weight data g2 of the objective direction connection to g2=1. If the candidate direction of delivery indicates a next closest route to the delivery destination position 102j, then the objective direction connection weight calculator 30 sets the weight data g2 of the objective direction connection to a value somewhere between 0.5 and 0.8, preferably g2=0.7. If the candidate direction of delivery indicates a third closest route to the delivery destination position 102j, then the objective direction connection weight calculator 30 sets the weight data g2 of the objective direction connection to a value somewhere between 0 and 0.5, preferably g2=0.

As shown in FIG. 7, with the above rule considered at the delivery start position 102a, since the candidate direction of delivery "forward movement" represents a direction closest to the delivery destination position 102j in the first processing cycle, the weight data g2 (forward movement) of the objective direction connection is set to g2 (forward movement)=1 in the input layer 62. Since the candidate direction of delivery "left" represents a direction next closest to the delivery destination position 102j, the weight data g2 (left) of the objective direction connection is set to g2 (left)=0.7 in the input layer 62.

Inasmuch as the candidate directions of delivery "backward movement" and "right" represent directions away from the delivery destination position 102j, the weight data g2 (backward movement) of the objective direction connection and the weight data g2 (right) of the objective direction connection are set to g2 (backward movement)=0 and g2 (right)=0 in the input layer 62.

In the process of step S9 for considering the preceding direction of delivery, since no value for the output fo is present in the output layer 68, the weight data gf (forward movement, left, right, and backward movement) of the feedback connection are set to gf=0 in the first processing cycle.

After the safety connection weight calculator 28, the objective direction connection weight calculator 30, and the feedback connection weight setting unit 32 have entered the weight data g1 of the safety connection, the weight data g2 of the objective direction connection, and the weight data gf of the feedback connection respectively to the input layers 61, 62, 63, learning processes in respective cycles are carried out in the hidden layers 66 according to the forward propagation learning algorithm to determine outputs of the response function fo (forward, backward, left turn, right turn, goal arrival, and emergency avoidance) for the output layer 68 in step S10.

As can be seen from the result of the first learning cycle (the number of times=1) in FIG. 7, since the output fo (forward movement) has a maximum value fo (forward movement)=0.9752, the first delivery route (moving point) is determined as forward movement. The next present position is selected to be a delivery en-route position 102b (moving point action determined in step S11).

If the output fo (goal arrival) is of a maximum value {if the value of the output fo (goal arrival) is greater than the other values of the output fo (forward movement), the output fo (left turn), the output fo (right turn), the output fo (backward movement), and the output fo (emergency avoidance), i.e., if it is maximum}, then the workpiece W is recognized as having arrived at the delivery destination position 104.

The output fo (emergency avoidance) represents a deadlock. If the value of this output fo (emergency avoidance) is maximum, it means that it becomes impossible to determine optimum delivery route data according to the learning process. When this happens, the processing is finished, and an alarm is issued to indicate the end of the processing to the user. The reason of the deadlock, e.g., a failure to go beyond an obstacle in a certain position in the movable range 100, may be displayed by letters on a display unit (not shown).

Then, it is decided whether the delivery en-route position 102*b* selected in step S11 is the delivery destination position 102*j* or not in step S12.

If the result of the decision in step S12 is negative, then the environment is recognized again in step S6, and then the weight data g1 of the safety connection is calculated and acquired in step S7. If the candidate direction of delivery represents "right" as viewed from the delivery en-route position 102*b* that is the present position, then since the obstacle 108 is present, the weight data g1 (right) of the safety connection is calculated as g1=0. If the candidate directions of delivery represent "forward movement" and "backward movement", then since the obstacle 107A and the movable range 100 are present in the second cell □, the weight data g1 (forward movement, backward movement) of the safety connection is calculated as g1 (forward movement, backward movement)=0.7. If the candidate direction of delivery represents "left", then since no obstacle is present in three successive cells □ in the direction of delivery, the weight data g1 (left) of the safety connection is calculated as g1=1, and established in the input layers 61 for the second forward propagation learning process (see the values indicated by the number of times which is "2" in FIG. 7).

In step S8, a minimum cost is calculated and acquired. Specifically, the candidate direction of delivery (forward movement) at the delivery en-route position 102*b*, represents a direction closest to the delivery destination position 102*j*, and hence the weight data g2 of the objective direction connection is set to g2 (forward movement)=1 in the input layer 62. Since the candidate direction of delivery (left) represents a direction next closest to the delivery destination position 102*j*, the weight data g2 (left) of the objective direction connection is set to g2 (left)=0.7 in the input layer 62. Since the candidate directions of delivery "backward movement" and "right" represent directions away from the delivery destination position 102*j*, the weight data g2 (backward movement) of the objective direction connection and the weight data g2 (right) of the objective direction connection are set to g2 (backward movement)=0 and g2 (right)=0 in the input layer 62.

The feedback connection weight setting unit 32 then sets the input layer 63 to the weight data gf (forward movement, left, right, and backward movement) of the feedback connection in step S9. Attaching importance to the preceding direction of delivery, the weight data gf (forward movement, left, right, and backward movement)=(0.9752, 0.0081, 0.0000, 0.0000), which is the result from the first processing cycle, is set in the input layer 63.

The second forward propagation learning process is carried out in step S10, and a movement route (moving cell) is determined in step S11. Since the value of forward movement of the output fo is a greatest value fo=0.9799, a delivery en-route position 102*c* (see FIG. 6) located ahead on the delivery route is selected.

It is decided whether the delivery en-route position 102*c* is the same as the delivery destination position 102*j* or not in step S12. The above processing in steps S6 through S12 is repeated until the delivery en-route position 102*c* becomes equal to the delivery destination position 102*j*.

If the result of the decision in step S12 is affirmative, i.e., if the delivery en-route position 102*c* becomes equal to the delivery destination position 102*j*, then an optimum delivery route from the delivery start position 102*a* to the delivery destination position 102*j* is determined. That is, a forward optimum delivery route and also a backward optimum delivery route are determined. A route plan list is generated, and supplied as optimum delivery route data to the robot controller 14 in step S13. Actually, since the value of the output fo (goal arrival)=0.9090 is greater than the other values of the output fo (forward movement, left turn, right turn, backward movement, and emergency avoidance), i.e., is maximum, in the result of the tenth processing cycle (the number of times=10) shown in FIG. 7, it is recognized that the workpiece W has arrived at the delivery destination position 102*j*. By comparing the recognized result, i.e., the delivery en-route position which is the goal position, and the preset delivery destination position 102*j* (the delivery destination position 102*j* on the map 110 stored in the memory 26) with each other, it is determined that the delivery en-route position is the same as the delivery destination position 102*j*.

When the robot controller 14 is started to operate, it plays back the delivery robot 16 to deliver the workpiece W safely and accurately within a shortest period of time automatically from the delivery start position 102*a* to the delivery destination position 102*j* based on the optimum delivery route data in step S14.

In this embodiment, as described above, for determining an optimum route for the delivery robot 16 to deliver the workpiece W from the delivery start position 102*a* to the delivery destination position 102*j*, the map 110 is automatically generated simply by entering the movable range 100 of the delivery robot 16 and the positional data (coordinates) of the delivery start position 102*a*, the delivery destination position 102*j*, and the obstacles 105, 106, 107, 108, and the neural network processor 34 automatically generates optimum delivery route data by referring to the generated map 110, while taking into account the safety of the direction of delivery, the shortest distance, and the preceding direction of delivery. By taking into account the preceding direction of delivery, i.e., by increasing the weight data gf of the feedback connection, which is the weight of the preceding direction of delivery, the probability that the workpiece W will move in the preceding direction of delivery is increased, and hence the workpiece W will be delivered along one general direction as much as possible. As a consequence, the workpiece W can be delivered at an increased speed, or stated otherwise the workpiece W can be delivered in a reduced period of time.

According to the present invention, a spatial structure in which the delivery robot can move from the delivery start position to the delivery destination position is described according to the quadtree method, and stored as a map. Subsequently, an optimum feed route is determined according to the neural network processing by referring to the stored map, taking into account the safety of the direction of delivery, the shortest distance, and the preceding direction of delivery.

Consequently, it is possible to automatically (autonomously) generate an optimum delivery route for articles, taking into account the shortest distance, the accuracy (safety), and the shortest period of time for delivery.

The shortest delivery route in the direction of delivery is determined preferentially taking into account the safety of the direction of delivery, the shortest distance, and the preceding direction of delivery. As a result, it is possible to deliver articles within a shorter period of time.

A unit delivery distance for the delivery robot in the map is selected to the length of one side of a rectangular parallelepiped that circumscribes the article. Therefore, the map which is descriptive of the spatial structure can easily divided into cells.

Furthermore, a neural network which divides and standardizes the safety of the direction of delivery and the shortest delivery distance in a range of values from 0 through 1 can efficiently be utilized.

With the arrangement of the present invention, it is not necessary to recognize the position and dimensions of an article which is being delivered, with an image processing apparatus, and it is not necessary for the operator to teach the delivery route to the delivery robot. Therefore, optimum delivery routes can be generated with ease for various operating modes and different types of workpieces to be delivered.

Since a delivery route is automatically generated, the operator is not required to be highly skilled to generate the delivery route.

As a result, the cost of delivery of articles can be reduced.

Although a certain preferred embodiment of the present invention has been shown and described in detail, it should be understood that various changes and modifications may be made therein without departing from the scope of the appended claims.

What is claimed is:

1. A method of determining an optimum delivery route for delivering an article from a delivery start position to a delivery destination position with a delivery robot capable of lifting the workpiece with an end effector at the delivery start position, delivering the workpiece in forward, backward, left, and right directions, and lowering the workpiece at the delivery destination position, comprising the steps of:

describing a spatial structure in which the delivery robot is movable, from said delivery start position to said delivery destination position according to a quadtree method, and storing the described spatial structure as a map; and determining an optimum delivery route according to neutral network processing by referring to said map taking into account the safety of a direction of delivery and a shortest delivery distance.

2. A method according to claim 1, wherein the optimum delivery route is determined taking into account the safety of the direction of delivery, the shortest delivery distance, and a preceding direction of delivery.

3. A method according to claim 1, wherein a unit delivery distance for the delivery robot in said map is selected to the length of one side of a rectangular parallelepiped that circumscribes the article.

4. A method according to claim 3, wherein for determining an optimum delivery route from a present position to a next delivery position for the article, the safety of the direction of delivery is standardized and described in a range of values from 0 through 1, with the value 1 representing that no obstacle is present in three unit delivery distances ahead in a present direction of travel, with the values from 0.5 to 0.8 representing that an obstacle is present in the second unit delivery distance ahead in the present direction of travel, and the value 0 representing a direction of delivery with an obstacle present therein, and the shortest delivery distance in the direction of delivery is standardized and described in a range of values from 0 through 1, with the value 1 representing that the distance from said present position to said delivery destination position is shortest in the direction of travel, and with the values from 0.5 to 0.8 representing that the distance from said present position to said delivery destination position is second shortest in the direction of travel.

5. A method according to claim 4, wherein the safety of the direction of delivery is standardized and described in a range of values from 0 through 1, with the value 0.7 representing that an obstacle is present in the second unit delivery distance ahead in the present direction of travel, and the shortest delivery distance in the direction of delivery is standardized and described in a range of values from 0 through 1, with the value 0.7 representing that the distance from said present position to said delivery destination position is second shortest in the direction of travel.

6. An apparatus for determining an optimum delivery route for delivering an article from a delivery start position to a delivery destination position with a delivery robot capable of lifting the workpiece with an end effector at the delivery start position, delivering the workpiece in forward, backward, left, and right directions, and lowering the workpiece at the delivery destination position, comprising:

a map generator for describing a spatial structure in which the delivery robot is movable, from said delivery start position to said delivery destination position according to a quadtree method, and generating a map representing the described spatial structure;

storage means for storing the generated map;

a safety connection weight calculator for calculating the weight of a safety connection taking into account the safety of a direction of delivery, by referring to the map stored in said storage means;

an objective direction connection weight calculator for calculating the weight of an objective direction connection taking into account a shortest distance in the direction of delivery, by referring to the map stored in said storage means;

a neural network processor; and a feedback connection weight setting unit for storing an output from said neural network processor as the weight of a feedback connection for taking into account a preceding direction of delivery;

said neural network processor comprising means for determining an optimum delivery route according to a propagation learning algorithm based on said weight of the safety connection, said weight of the objective direction connection, and said weight of the feedback connection.

7. An apparatus according to claim 6, wherein a unit delivery distance for the delivery robot in said map is selected to the length of one side of a rectangular parallelepiped that circumscribes the article.

8. An apparatus according to claim 6, wherein for determining an optimum delivery route from a present position to a next delivery position for the article, the safety of the direction of delivery is standardized and described in a range of values from 0 through 1, with the value 1 representing that no obstacle is present in three unit delivery distances ahead in a present direction of travel, with the values from 0.5 to 0.8 representing that an obstacle is present in the second unit delivery distance ahead in the present direction of travel, and the value 0 representing a direction of delivery with an obstacle present therein, and the shortest delivery distance in the direction of delivery is standardized and described in a range of values from 0 through 1, with the value 1 representing that the distance from said present position to said delivery destination position is shortest in the direction of travel, and with the values from 0.5 to 0.8 representing that the distance from said present position to said delivery destination position is second shortest in the direction of travel.

9. An apparatus according to claim 8, wherein the safety of the direction of delivery is standardized and described in a range of values from 0 through 1, with the value 0.7 representing that an obstacle is present in the second unit delivery distance ahead in the present direction of travel, and the shortest delivery distance in the direction of delivery is standardized and described in a range of values from 0 through 1, with the value 0.7 representing that the distance from said present position to said delivery destination position is second shortest in the direction of travel.

10. An apparatus according to claim 6, wherein said weight of the safety connection, said weight of the objective direction connection, and said weight of the feedback connection, which are supplied as inputs to said neutral network processor, are established with respect to each of forward, left, right, and backward directions, and an output of said neutral network processor is determined with respect to each of forward, left, right, and backward directions.

11. An apparatus according to claim 6, wherein said weight of the safety connection, said weight of the objective direction connection, and said weight of the feedback connection, which are supplied as inputs to said neutral network processor, are established with respect to each of forward, left, right, and backward directions, and an output of said neutral network processor is determined with respect to each of forward, left, right, backward directions, goal arrival, and emergency avoidance.

* * * * *